(12) United States Patent
Potter

(10) Patent No.: US 8,731,945 B2
(45) Date of Patent: *May 20, 2014

(54) METHOD FOR RECOGNIZING AND INTERPRETING PATTERNS IN NOISY DATA SEQUENCES

(71) Applicant: Jerry Lee Potter, Fort Collins, CO (US)

(72) Inventor: Jerry Lee Potter, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/955,117

(22) Filed: Jul. 31, 2013

(65) Prior Publication Data

US 2013/0317816 A1 Nov. 28, 2013

Related U.S. Application Data

(63) Continuation of application No. 12/657,770, filed on Jan. 27, 2010, now Pat. No. 8,504,374.

(60) Provisional application No. 61/206,575, filed on Feb. 2, 2009.

(51) Int. Cl.
*G10L 21/00* (2013.01)

(52) U.S. Cl.
USPC ........................................................ 704/277

(58) Field of Classification Search
USPC ........................................................ 704/277
See application file for complete search history.

(56) References Cited

U.S. PATENT DOCUMENTS

| | | | |
|---|---|---|---|
| 5,729,659 A * | 3/1998 | Potter | 704/270 |
| 5,754,736 A | 5/1998 | Aust | |
| 6,064,957 A | 5/2000 | Brandow et al. | |
| 6,629,069 B1 | 9/2003 | Attwater et al. | |
| 6,910,012 B2 | 6/2005 | Hartley et al. | |
| 7,058,575 B2 | 6/2006 | Zhou | |
| 7,072,837 B2 | 7/2006 | Kemble et al. | |
| 7,333,928 B2 | 2/2008 | Wang et al. | |
| 8,194,986 B2 * | 6/2012 | Conwell | 382/224 |
| 8,265,925 B2 * | 9/2012 | Aarskog | 704/9 |
| 8,504,374 B2 | 8/2013 | Potter | |
| 2004/0093331 A1 * | 5/2004 | Garner et al. | 707/3 |
| 2005/0108001 A1 * | 5/2005 | Aarskog | 704/10 |
| 2005/0108010 A1 | 5/2005 | Frankel et al. | |
| 2005/0114122 A1 | 5/2005 | Uhrbach et al. | |

(Continued)

OTHER PUBLICATIONS

Aho, A. V. et al. "Compilers, Principles, Techniques and Tools" Addison-Wesley Publishing Company, 1986, 808 pages.

(Continued)

*Primary Examiner* — Michael N Opsasnick
(74) *Attorney, Agent, or Firm* — Jason H. Vick; Sheridan Ross, PC

(57) ABSTRACT

This invention maps possibly noisy digital input from any of a number of different hardware or software sources such as keyboards, automatic speech recognition systems, cell phones, smart phones or the web onto an interpretation consisting of an action and one or more physical objects, such as robots, machinery, vehicles, etc. or digital objects such as data files, tables and databases. Tables and lists of (i) homonyms and misrecognitions, (ii) thematic relation patterns, and (iii) lexicons are used to generate alternative forms of the input which are scored to determine the best interpretation of the noisy input. The actions may be executed internally or output to any device which contains a digital component such as, but not limited to, a computer, a robot, a cell phone, a smart phone or the web. This invention may be implemented on sequential and parallel compute engines and systems.

21 Claims, 5 Drawing Sheets

(56) References Cited

U.S. PATENT DOCUMENTS

| | | | |
|---|---|---|---|
| 2008/0275694 A1* | 11/2008 | Varone | 704/9 |
| 2009/0076798 A1 | 3/2009 | Oh et al. | |
| 2010/0048242 A1* | 2/2010 | Rhoads et al. | 455/556.1 |
| 2010/0198592 A1* | 8/2010 | Potter | 704/233 |
| 2011/0143811 A1* | 6/2011 | Rodriguez | 455/556.1 |

OTHER PUBLICATIONS

Allen, Julie D. et al. "The Unicode Standard, 5.0, The Unicode Consortium" Addison-Wesley Nov. 2006, 1438 pages.

Fillmore, C. "The Case for Case" Universals in Linguistic Theory, edited by Emmon Back and Robert Hams, Holt, Rinehart and Winston Inc. 1968, 109 pages.

Fiscus, J.G., "A Post-Processing System to Yield Reduced Word Error Rates: Recognizer Output Voting Error Reduction" IEEE Workshop on Automatic Speech Recognition and Understanding, 1997, 8 pages.

Flynn, Michael J. "Some Computer Organizations and Their Effectiveness" IEEE Transactions on Computers, vol. C-21, No. 9, Sep. 1972, pp. 948-960.

Fuji, A., et al., "A Method for Open-Vocabulary Speech-Driven Text Retrieval," Conference on Empirical Methods in Natural Language Processing, pp. 188-195, Jul. 2002.

Jackendoff, R. "The Status of Thematic Relations in Linguistic Theory" Linguistic Inquiry, Vo. 18, No. 3, 1987, 43 pages.

Jeong, Minwoo et al. "Semantic-Oriented Error Correction for Spoken Query Processing" Workshop on Automatic Speech Recognition and Understanding (ASRU' 03), pp. 156-161, Dec. 2003.

Kaki, Satoshi et al. "A Method for Correcting Errors in Speech Recognition Using the Statistical Features of Character Co-Occurrence" COLING-ACL 1998, pp. 653-657, 17 pages.

Minsky, Marvin "A Framework for Representing Knowledge" Massachusetts Institute of Technology, A.I. Laboratory, Memo No. 306, Jun. 1974, 82 pages.

Potter, Jerry "Associative Computing: A Programming Paradigm for Massively Parallel Computers" Frontiers of Computer Science, Plenum Publishing, 1992, 302 pages.

Potter, Jerry et al. "ASC: An Associative-Computing Paradigm" Kent State University, Nov. 1994.

Potter, Jerry et al. "Prose as a Model of Computation" Proceedings of the 2007 International Conference on Foundations of Computer Science, Jun. 25-28, 2007.

Winston, Patrick Henry "Artificial Intelligence" 1977, 452 pages.

Official Action for U.S. Appl. No. 12/657,770, mailed Oct. 12, 2012.

Official Action for U.S. Appl. No. 12/657,770, mailed Apr. 4, 2013.

Notice of Allowance for U.S. Appl. No. 12/657,770, mailed Apr. 24, 2013.

* cited by examiner

| verb | arg | prep 1 | arg 1 | prep 2 | arg 2 | prep 3 | arg 3 | prep 4 | arg 4 | prep 5 |
|---|---|---|---|---|---|---|---|---|---|---|
| add | t_argin | to | t_argin | t_dot | ad | | | | | |
| add | t_pronoun | to | t_argin | t_dot | ad | | | | | |
| average | t_cid | t_dot | av | | | | | | | |
| clear | t_rcid | t_dot | cl | | | | | | | |
| close | t_tabspec | t_dot | co | | | | | | | |
| cumulative | add | t_arg1 | to | t_arg2 | and | multiply | by | t_arg3 | t_dot | ca |
| enumerate | t_cid | from | t_value | to | t_value | t_dot | eu | | | |
| find | t_colid | between | t_value | and | t_value | t_dot | bt | | | |
| find | the | rows | with | t_modifier | in | t_colid | t_dot | md | | |
| goodbye | t_dot | gb | | | | | | | | |

Figure 2

| word | size output | homonym word 1 | homonym word 2 |
|---|---|---|---|
| opened | 1 | open | |
| cent | 1 | set | |
| h. | 2 | age | |
| resultant | 2 | result | in |

Figure 3

| word 1 | word 2 | size output | homonym word 1 | homonym word 2 |
|---|---|---|---|---|
| the | track | 1 | subtract | |
| the | side | 1 | divide | |
| label | : | 2 | label | column |
| two | to | 2 | to | two |
| suite | | 14 | 1 | suite14 | |
| some | correct | 1 | subtract | |

Figure 4

| Symbol | Matches |
|---|---|
| ? | Any word |
| * | A limited sequence of words |
| # | Any number |
| ! | End of sequence |
| % | Spreadsheet map coordinates |
| $ | An unlimited string of words |

Figure 5

| TRCC | Meaning |
|---|---|
| t_argin | A row, column, cell name, number or a string |
| t_colid | A column name |
| t_cell | A row column combination |
| t_lop | A logical operator |
| t_value | A number |
| t_tabspec | A table name |
| t_arg1 | A row, column, cell name or a number |

Figure 6

```
frameID 1, numSlots=2:
    |slot  0|slot  1|
    |beg end|beg end|
VP|  0   0 |  3   3 |
TR|  1   2 |  4   5 |
```

Figure 7

```
frameID 1, numSlots=2:
    |slot  0|slot  1|
    |beg end|beg end|
VP|  0   0 |  3   3 |
TR|  1   2 |  4   5 | frameID 2, numSlots=2:
    |slot  0|slot  1|
    |beg end|beg end|
VP|  0   0 |  4   4 |
TR|  1   3 |  5   5 |
```

Figure 8

```
"subtract h. a john size ."
"add jane h. or size ."
"add jane h. the size ."
"add and jane aged to size ."
"subtract age drum john size ."
"that jane h. to five ."
```

Figure 9

S ← verbphrase pp verbphrase ← VERB np pp ← PREP np | γ np ← {DETERMINER} ADJECTIVE* NOUN

Figure 10 vp1 t_arg1 vp2 t_arg2 vp3 t_arg3 ...
a – The Thematic Relation Pattern Format add t_arg1 to t_arg2 t_dot
b – The Thematic Relation Pattern for the add Command to age add 5 .
c – An "Out-of-order" add Command

Figure 11

| long term | long term income | number of years total | income per year |
|---|---|---|---|
| full professor | 0 | 12 | 15 |
| associate professor | 0 | 11 | 17 |

| test105 | height | age | add in | too much | weight |
|---|---|---|---|---|---|
| jane | 64 | 55 | 20 | 35 | 105 |
| john | 71 | 68 | 142 | 20 | 153 |
| harry | 66 | 34 | 157 | 42 | 192 |

Figure 12

| word 1 | word 2 | word 3 | word 4 | word 5 | word 6 | ... | table number | row number | column number | additional items |
|---|---|---|---|---|---|---|---|---|---|---|
| full | professor | | | | | | 0 | 2 | 1 | |
| associate | professor | | | | | | 0 | 3 | 1 | |
| long | term | income | | | | | 0 | 1 | 2 | |
| number | of | years | total | | | | 0 | 1 | 3 | |
| income | per | year | | | | | 0 | 1 | 4 | |
| full | professor | long | term | income | | | 0 | 2 | 2 | |
| full | professor | number | of | years | total | | 0 | 2 | 3 | |
| full | professor | income | per | year | | | 0 | 2 | 4 | |
| associate | professor | long | term | income | | | 0 | 3 | 2 | |
| associate | professor | number | of | years | total | | 0 | 3 | 3 | |
| associate | professor | income | per | year | | | 0 | 3 | 4 | |

Figure 13

| table name word 1 | table name word 2 | ifstream | ofstream | lexicon ID | sheet number | additional items |
|---|---|---|---|---|---|---|
| long | term | | | 0 | 4 | |

Figure 14

METHOD FOR RECOGNIZING AND INTERPRETING PATTERNS IN NOISY DATA SEQUENCES

CROSS-REFERENCE TO RELATED APPLICATIONS

The present application is a Continuation of U.S. patent application Ser. No. 12/657,770, filed Jan. 27, 2010, now U.S. Pat. No. 8,504,374, which claims the benefit of and priority under 35 U.S.C. §119(e), to U.S. Provisional Application No. 61/206,575, filed Feb. 2, 2009, entitled "A Method for Recognizing and Interpreting Patters in Noisy Data Sequences". The entire disclosure of which is hereby incorporated by reference in its entirety.

FIELD OF THE INVENTION

The present invention addresses mapping possibly noisy input sequences onto a semantic interpretation in a limited domain and outputting one or more actions reflecting said interpretation. A preferred embodiment of this invention is on a parallel computer and deals with possibly noisy textual input pertaining to a database.

BACKGROUND OF THE INVENTION

The present invention pertains to using sequential, parallel and systems of computers to understand noisy textual data. The output of automatic speech recognition software may contain numerous types of errors, including but not limited to extraneous words, missing words, misrecognized words, words out of sequence as well as any combination of these items and other errors. In the past, ASR output contained as many as 15% misrecognized words, and as many as 30% to 80% of sentences contained errors. Even today, modern voice recognition systems typically misrecognize up to 10% of the words.

Automatic speech recognition systems (ASR) use numerous and various techniques to produce the best possible output. Predominately, grammars, language models, statistical and probabilistic methods are used to improve recognition rates. In addition, ASR post processing algorithms use lexical statistical methods, voting and minimum edit distance of corrections based on domain knowledge and morphological and query template information.

Traditional grammars are syntax oriented and context free and their implementations are of limited usefulness in the presence of noisy, uncertain, missing and/or redundant information. In recent years a concept based approach has been introduced. It has been applied to "error-tolerant language understanding (U.S. Pat. No. 7,333,928)" using a predefined concept/phrase grammar. However, grammars in general have several weaknesses. They are domain specific, difficult to modify and maintain and their creation requires considerable expertise and is time consuming.

Thus there is a need for a semantic based system that relies on easily augmented and modified thematic patterns. The domain vocabulary of the system needs to be dynamic and noise tolerant. The system needs to be suitable for sequential and parallel computers. The output of the system needs to be in a semantic form that can be easily understood by the user and can be converted into forms utilized by internal and external digital devices.

SUMMARY OF THE INVENTION

The description in this invention addresses specifically input in the form of possibly noisy character sequences as might be produced by voice recognition or automatic speech recognition systems pertaining to data files consisting of labeled tables.

This invention is a method which combines techniques from linguistics and several areas of computer science into a unique system of thematic relation patterns, homonym tables, dynamic lexicons, regular expressions and databases. The general approach is to generate all possible interpretations of the possibly erroneous input sequence and select the one with the best score.

This invention identifies verb and preposition keywords from a table of thematic patterns. Unlike grammars, a table of thematic patterns can be easily modified interactively.

Lists of verb and preposition homonyms and near homonyms are used to generate a plurality of alternative inputs. Using only verb and preposition homonyms at this stage reduces the total number of alternative combinations that need to be processed.

The homonym lists contain common misrecognized homonyms such as "to," "too," and "two." They may be modified interactively. Thus speaker dependent erroneous output of a speech recognition program such as "h." for "age" can be input into the lists.

The keywords in each alternative of the input are used to select a plurality of thematic patterns. The thematic patterns are used to generate a plurality of all possible parsings of the alternative input.

The alternative parsings divide the alternative inputs into verb, preposition and noun phrase segments. A separate set of homonym lists similar to the verb/preposition lists is used to generate a plurality of all possible interpretations of the noun phrases.

The alternative noun phrases are matched against the sets of lexicons derived from the user specified data tables.

Various phases of this algorithm can be executed sequentially and/or in parallel. Parallel execution is desired because of the large number of alternatives that must be scored. The alternative with the lowest score is selected. It is converted from its internal form into a textual version that is echoed back to the user for verification. Upon verification, the selected alternative is converted into the form(s) required to perform the action specified.

It should be understood that this summary in no way limits the applicability of this invention to any type of digital input sequence. This invention can be used to post process input sequences from numerous types of input/output devices and computer systems by using different sets of thematic relation patterns, homonym files, dynamic lexicons, regular expressions and associated databases and data files for each different data type, system and device.

BRIEF DESCRIPTION OF THE DRAWINGS

FIG. 2 is an example of thematic relation patterns.

FIG. 3 is an example of a one word homonym and misrecognized word list.

FIG. 4 is an example of a two word homonym and misrecognized word list.

FIG. 5 is an example of regular expression symbols and what they match.

FIG. 6 is an example of some of the noun phrase classes as specified in the thematic relation patterns. Some of these and other non-terminal pattern types (i.e. classes) are shown in FIG. 2 and can be recognized by an initial t_.

FIGS. 7 and 8 are examples of frame data structures, showing the slot partitions.

FIG. 9 contains examples of noisy text input sequences.

FIG. 10 is an example of a conventional grammar.

FIG. 11 illustrates thematic relation patterns.

FIG. 12 illustrates two spreadsheets with labeled rows and columns.

FIG. 13 is a portion of the lexicon associated with the first table in FIG. 12. The lexicon is incomplete. Not all entries are included. "Additional items" refers to additional lexicon items not shown.

FIG. 14 is an example of the environment table used to save the names and related data of all tables (data files) that can be referenced by the potentially noisy input data. It is incomplete. It shows only a partial entry for the first table in FIG. 12. "Additional items" refers to additional data fields not shown.

TERMINOLOGY

Figure 1:
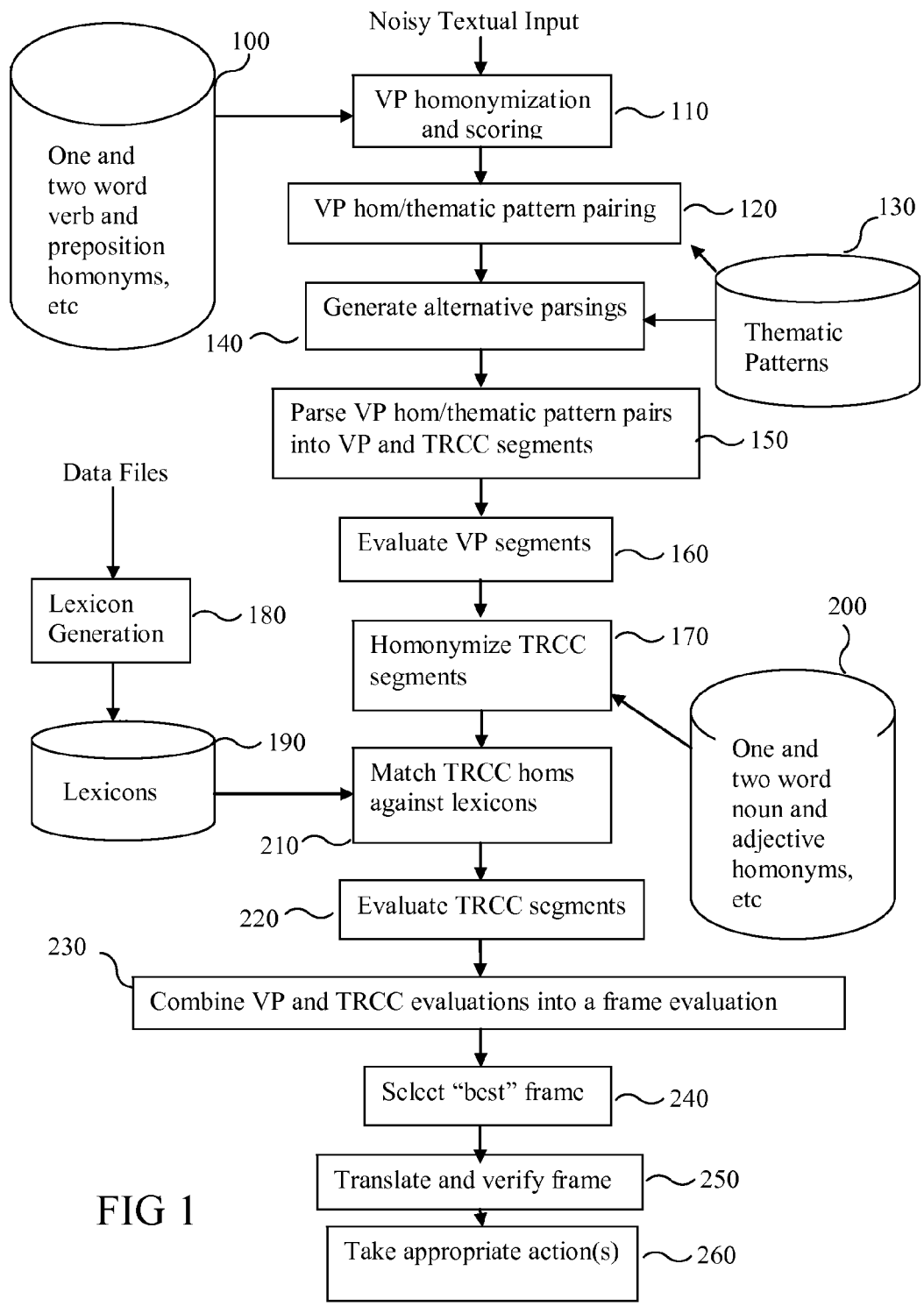
FIG. 1 is a block diagram of the major components of an apparatus illustrative of the present invention.

1) Character data. The term "character data" includes all data that is organized into chunks. The chunks may be fixed length such as integers, floating point numbers, or ASCII or EBCDIC characters; the data may be variable length such as UTF-8, as long as the basic operating system and programming language interpret each variable length chunk or character as a single datum. Said data may be produced by i) a typist, ii) a handwriting recognition program, iii) a voice recognition or automatic speech recognition program, iv) another digital computer, or v) any one of a number of sensors or input devices.

2) Thematic relations. The term thematic relation pertains to the meaning that a noun phrase plays with respect to the action or state described by a sentence's verb. This relationship is often expressed by a preposition in English. In this patent, thematic relations are expressed in the form of patterns. Thus, thematic relation patterns, thematic patterns and patterns all refer to patterns as expressed in FIG. 11b and FIG. 2.

3) Environmental Model: Each set of thematic relation patterns, regular expressions, homonyms, and associated databases files is referred to as an environment or environmental model. FIG. 14 shows an example of a table used to save the names of the files in an environment.

4) Noisy sequence of data: As used herein, "noisy data", "noisy data sequence", "noisy input data" and related terms refer to sequences of data that do not conform to the preconceived notion of how the data sequences should appear based on an environment. Noisy data may contain extraneous, unexpected, uncertain, misinterpreted, missing and/or redundant items. Noisy data includes the trivial or the null case, i.e. the presence of no noise.

5) Interpretation: As used herein, "interpretation" means the ability to extract information from a noisy data sequence and generate a representative data structure in one or more databases which can be accessed and used by all of the various environments. That is, different sequences such as "The little old lady.", "The old little lady.", "The lady, little and old." map onto the same structure. Moreover, this structure must be able to be used to generate equivalent sequences for any user, sensor, device, controller or computer for internal or external use.

6) The terminology for grammars and regular expressions, as used herein, comes from the field of computer compilers, such as detailed in "COMPILERS, Principles, Techniques and Tools" by Aho, Sethi and Ullman, Addison-Wesley, 1986, unless otherwise stated. A thematic relationship pattern can be thought of as a type of grammar with limited syntactic information. As such, grammar terminology is used for the thematic patterns. Grammars contain production rules which consist of terminal symbols and non-terminal symbols. Terminal symbols may be words, images or any type of input from a sensor, device, another computer or another algorithm. The non-terminal symbols of a grammar may consist of i) the left hand side of a rule, ii) a type symbol that refers to a set of sequences of symbols in a lexicon, iii) a type symbol that refers to numbers and/or string constants, or iv) a type symbol that refers to a set of regular expressions.

7) Phrases. The term "phrase" is used in its linguistic sense. A VP phrase is a verb phrase or prepositional phrase. A verb phrase is a verb followed by a noun phrase (NP). A prepositional phrase is a preposition followed by a noun phrase. Note that the only difference between a verb phrase and a noun phrase is the type of the initial word sequence. As a result, a common data structure called a slot is used to hold both verb and prepositional phrases.

8) Sequences and segments. The original input is a sequence of terminal symbols. During processing, the input sequence is parsed into segments. There are three segment types: verb segments, prepositional segments and TRCC segments. Note: a VP phrase contain both a verb or preposition and a noun phrase, but a VP segment consists of only a verb or a preposition.

9) Thematic relation patterns. The intent of the thematic relation patterns used in this invention is to define a pattern that can be used to recognize noisy input sequences. The patterns may contain i) terminal symbols (constants) and non-terminal symbols which represent classes of noun phrase patterns. Unlike grammars, the order of the terminal symbols and their related noun phrases is not fixed. For example, the traditional grammar in FIG. 10 encompasses the fact that the verb phrase must be first, and the prepositional phrases may occur in any order, but it does not specify which prepositions are governed by which verbs. The thematic verb-preposition information is present in the thematic relation patterns of the form illustrated in FIG. 11a. More specifically, the thematic pattern for "add" is shown in FIG. 11b. It identifies the specific verb, "add," the preposition, "to," and gives the "standard" order, but the phrases may be in any order as illustrated in FIG. 11c. The t_dot non-terminal is the end of input signal. The conventional "period" character can not be used as a terminal symbol, because it is also used in decimal numbers and abbreviations.

10) Parallelism. As used herein, three types of parallelism are identified. i) Data parallelism is synonymous with the traditional SIMD parallelism as defined by Flynn, 1972. SIMD parallelism refers to one physical program stream being broadcast to and executed by multiple ALU processors. It includes the concept of associative computing as defined by Potter, 1992, which allows the separate processors to conditionally execute the broadcast instruction based on their local data. ii) MIMD parallelism as defined by Flynn is what is commonly referred to simply as parallelism in the computer science literature. It involves multiple physically separate program streams executing on different CPUs simultaneously. Many hardware manufacturers simulate SIMD parallelism by replicating multiple copies of the same code for MIMD execution on different sets of data. This type of parallelism is sometimes called SPMD parallelism. iii) multiple associative parallelism is a hybrid version of MIMD and SIMD parallelism (See Potter, Baker, et al., 1997). In multiple associative parallelism, multiple physically separate programs are broadcast to all the ALUs. The ALUs determine which program to execute based on their local data. The ALUs may switch from one physical program stream to another at their discretion.

11) Set and set processing. At several steps in the algorithm described herein, a plurality or set of alternatives is generated. The sets may be processed in parallel all at once or sequentially. However, the algorithm is designed for maximum parallelism to achieve real time execution.

12) Homonymize. Homonymize refers to generating variants of a sequence based on homonyms, common misrecognitions, mis-pronunciations, mis-typings and other substitutions. For example, the sequence "Add weight two height." can be homonymized to "Add weight to height." Misrecognitions and mistypings are those errors generated by a speech recognition program or when a typist errs. For example, "age" may be misrecognized as "h." or "put" may be mistyped as "pur" (r is next to t on the standard QWERTY keyboard). Homonymization can be applied to other data sequences, such as digital imagery with the appropriate modifications.

13) Frames and slots. This algorithm uses an internal data structure called a frame. A frame consists of a collection of VP phrases stored in slots. A slot contains (1) a segment of the input command, (2) the type of the segment, and (3) the semantic "interpretation" of the segment such as i) its corresponding table, row and column number, ii) the code of an intended action, or iii) constants extracted from the input sequence associated with a regular expression.

14) Regular expressions. A regular expression represents of a number of terminal symbols (perhaps none) with one or more special regular expression symbols. The regular expression symbols are shown in FIG. 5.

15) TRCCs. The non-terminal symbols in a thematic pattern and the noun phrase classes to which they refer are known generically as TRCCs. TRCC is an acronym for Table, Row, Column, and Cell. Many TRCCs such as t_row specify what kind of variable the input segment must match (i.e. its class). FIG. 6 is a partial list of TRCCs.

16) ACE tables, tables and databases. The environment consists of a set of one or more data files organized into one or more databases. Each data file contains a table of information. FIGS. 2,3,4,12,13,14 are example of data file tables. Tables with the column and row name format are ACE tables. Some tables may not have row names.

DETAILED DESCRIPTION

It should be understood that this description is an illustration of a preferred embodiment of the invention only. It is not intended to limit the scope of this invention in any way.

In a preferred embodiment, the said method post processes textual output from automatic speech recognition systems for:

1) the recognition of thematic patterns in noise free and noisy data sequences; and
2) the interpretation of the said data sequences in reference to a number of hardware devices, databases or data files. The said databases and data files may be obtained from various sources such as directly from the user, other computers, peripheral devices or the internet and may be used directly or may be modified or augmented or used to generate auxiliary databases and data files. The databases and data files may be a priori or interactively modified, augmented or generated; and
3) the extraction of information from the said data sequences:
   a) the said data sequences may originate from many different sources, such as: computers; computer storage devices including but not limited to hard drives, CDs, and USB drives; the internet; sensor devices; software programs, including but not limited to automatic speech recognition and text recognition systems; any source of textual or character input such as a keyboard, "notepad," mouse, hand held computer, personal computer, PDA, cell phone, smart phone, conventional phone, TV remote control; any mechanical device controlled by touching or pushing buttons; a touch screen or similar device whether the data is input by touching the screen directly or with a stylus, whether input is by identifying a specific area on the screen or by generating a sequence of motions that can be "recognized" by or translated into a data sequence such as a character string; and
   b) the said data sequences may be generated externally or internally, by hardware or software; and
   c) the said data sequences may be i) noise free, or have ii) missing components, iii) noisy components, iv) misrecognized components, v) permuted, rotated, transformed, out of order or out of place components.
4) the generation of expected, anticipated or missing data; and
5) the generation of databases consisting of a multitude of data structures to store said extracted information; and
6) the generation of control information for sensors and devices from databases and extracted information; and
7) the generation of output information for the said internal and external sources and other peripheral devices from a priori databases and said generated databases; and
8) the generation of output data sequences for:
   a) controlling devices, digital and otherwise; and
   b) controlling machinery with digital components including, but not limited to, construction, industrial and agricultural machinery, automobiles, trucks, trains and aircraft; and
   c) sending messages to devices, sensors, or computers; and
   d) sending textual, visual, auditory, odoriferous, or tactical information to users including but not limited to robots, humans and animals.

Initializations

Thematic relation pattern table initializations: a) the thematic relation patterns are input from an ACE data table 130, b) they are converted into the internal frame form. The object of the prepositional phrases is a non-terminal pattern type specifier as shown in FIG. 11*b*; *c*) A VP lexicon of verbs and prepositions is generated from the thematic relation patterns.

The VP and TRCC one word and two word homonym files are input 100, 200. See FIGS. 3 and 4.

A lexicon of the regular expressions is generated. See FIG. 5.

When a table is input, a lexicon for the table consisting of table, row, column and cell names and combinations thereof is generated 180. This step generates all of the "legal" combinations of proper nouns and their possessive forms. See FIG. 13 for a partial example of the lexicon for the first table in FIG. 12.

Overall Approach

FIG. 1 illustrates the algorithm according to the present invention. First, a noisy input sequence is converted into standard form. That is, the input sequence is parsed into an array of terminal symbols or words. The words are stripped of all initial and terminating blanks (and non-printing characters). All characters are converted to lowercase. The number of words (the size of the input sequence) is recorded.

Second, alternative input sequences, called VP homs, are generated in a process called "homonymization" 110. They are generated by modifying the verbs and prepositions (VPs) with entries from one word and two word homonym lists 100. The one word list (FIG. 3) contains one word homonyms (e.g. two::to, two::too, etc.) and "standard" misrecognitions, (i.e.

had::add, bad::add, etc.). Two word homonyms are generated from the two word list (FIG. 4). Some two word homonyms are "the track":: subtract, "good buy"::goodbye. Both the one word and two word lists allow the matched words to be replace by one or two words. The modified sequences are stored in a VP homs array. VP homs for all possible combinations of VP changes are generated. For example, the input sequence "had age two year" would be homonymized to "add age two year", "add age to year" and "add age too year". The original input sequence "had age two year." is considered a VP hom also. Associated with each VP hom is a HOMcount variable which is the number of changes that were made to the original sequence. "Add age to year" would have a HOMcount of 2.

Third. the best VP hom/thematic pattern combinations are determined 120. The number of keywords in common between each VP hom and each thematic pattern 130 are counted and recorded as the hitCount variable. But keywords that are repeated in the input sequence are counted only once. Matching VP homs with thematic patterns is a multiple associative process which can be very time consuming on a sequential machine. If time and space concerns are important, the VP homs are processed in a "best first" order as determined by a combination score.

In general, the preferred VP hom/thematic pattern combination is the one with the smaller combination score. The combination score measures:
1) the match between the total number of keyword terminals in the thematic pattern (VPcount) and the number of keyword terminals in the thematic pattern that are also in the VP hom sequence (hitCount). This match is measured by a "least squares fit" (the absolute value function, pfabs, is used in place of at least squares fit when it achieves the same ordering result); and
2) the match between total number of words in the VP homs sequence (homSize) and the number of keyword terminals in the thematic pattern that are also in the VP hom sequence (hitCount). This match is measured by a "least squares fit"; and
3) the fewest number of hom changes (HOMcount). This factor is measured by adding a small penalty (HOMcountFACTOR) for each hom change. (The HOMcountFACTOR is initially set to 0.1.) This is the HOMcount*HOMcountFACTOR expression in the combination score; and
4) the match between the number of slots in the thematic pattern (SLOTcount) and the number of slots in the VP hom (SlotCnt). This factor is measured by a "least squares fit." Dividing this factor by the MAX_NUM_SLOTS scales it to a value between 0 and 1 that does not overwhelm items 1) and 2).

At the end of the third step, all VP hom/thematic pattern combinations such as "'add age two year'/pattern 3" and "'add age to year'/pattern 4" have been generated and scored.

Fourth, a "frame score" is generated for all of the VP hom/thematic pattern combinations 140-230. The frame score is the basis for selecting the best combination. This is again a multiple associative process which can be very time consuming on a sequential machine. If time is important, this section may be done as a loop of sequential/data parallel operations or even as a double loop of sequential/sequential operations. In this case, a running record of the up-to-now best VP hom/thematic pattern combination frame score is maintained.

Frame Scoring

The frame score is calculated as follows. For each VP hom/thematic pattern combination, a vector of frames of the possible VP hom parsings 140 is generated based on the thematic pattern. In a bottom up process, the VP hom's words are matched against the symbols of the thematic pattern. The first word of the VP hom is a VP and will match exactly a terminal of a VP sequence in the thematic pattern. This signals the beginning of a VP segment. Then the second word of the VP hom is processed, etc. When the "next" VP hom word does not match the "next" VP symbol in the thematic pattern, it signals the end of the VP segment and the beginning of a noun phrase segment.

For example, assume the second table in FIG. 12 and the "add" thematic pattern of FIG. 11b are in the current environment and that the normalized input sequence "add jane weight to her height ." is being processed. The first word in the VP hom, "add", matches exactly the first terminal symbol in the thematic pattern, but the second word in the VP hom, "jane", does not match literally the second symbol, t_arg1. This signals the end of the first VP. It starts at word 0 (counting from zero) and ends at word 0 and is of length 1. The next word "jane" is recognized as a row name in the table and "matches" the type of the next symbol in the thematic pattern. The non-terminal symbols t_arg1 and t_arg2 accept row, column and cell names with an optional table name. The next word "weight" (a column name) is also recognized as matching the non-terminal, t_arg1. The next word "to" is recognized as a VP from the thematic file via the thematic lexicon and "stops" the t_arg1 sequence. The t_arg1 sequence starts with word 1 and ends at word 2 and is two words long. In a similar manner, the rest of the VP hom is partitioned into VP and TRCC components. The t_dot non-terminal in the thematic will match the period at the end of the VP hom and stops the "parsing" process.

When the process stops, a one-to-one match between pattern segments and input segments is verified. That is, every VP in the pattern is matched exactly once, and every word in the input sequence is in exactly one segment.

Visually, the frame vector can be represented as shown in FIG. 7. If multiple parsings are possible for the VP hom, as would be caused by the duplicate "add"s and "to"s in "add add in to to much." (The grammatically correct phrase is "too much." The "to much" in the input is a type of noise.) Then the frame vector may contain two or more frames and is represented as shown in FIG. 8. At this stage, the frames in the frame vector only identify the "break points" in the VP hom. The input sequence has not yet been physically parsed.

After the frame vector is generated, the frames are used to actually parse the VP hom into VP and TRCC segments 150. The segments are processed producing a frame score that measures the "fit" of the VP hom to the associated thematic pattern. Since the frame vector produces a potential match between the terminals of the thematic pattern and the words in the VP hom, the next step is to determine the quality of the match between the non-terminals and the noun phrase segments (TRCC is abbreviated as TR in the frame vector representation of FIGS. 7 and 8). Each frame of the frame vector and the associated VP hom text is processed to produce a corresponding output frame decorated with the various scoring parameters. These scoring parameters are used to generate the frame scores.

Next, the details of the scoring parameters are described and then how they are generated is discussed and then finally how the frame score is determined is described.

The Frame Scoring Parameters

The VP and TRCC scores described below are used primarily for the frame scores, however, the advanced TRCC score is also used to select the best TRCC match within and among the lexicons. The VP and TRCC scores are generated and stored in the frame on a slot by slot basis.

The VP Scoring Parameters

When evaluating the VP segments 160 of a VP hom/thematic pattern combination, two alternative scorings are possible. One for conventional terminal VP sequences like "FIND THE ROW WITH LABEL," and a second for VP t_lop sequences. The t_lop sequences are used for the logical operators, e.g. "greater than", "less than or equal to", etc. They are represented by the t_lop non-terminal and occur frequently in different patterns. They are processed like TRCC non-terminals against the t_lop lexicon, TLOPLEXICON. TLOPLEXICON is a lexicon of all of the logical operators: "equal to", "not equal to", "greater than", "less than", "greater than or equal to", and "less than or equal to".

Two different frame VP component scores are determined. The basic VP score is the number of terminals matched in the VP. The advanced VP score is a measure of the degree of match between the pattern terminal sequence in the VP and the VP sequence of words extracted from the VP hom dictated by the frame specification. The advanced VP score is the sum of several different factors The VP score is normalized by dividing it by the length of the longer of the VP sequence in the thematic pattern or the corresponding VP hom sequence. The factors are:
1) a normalized "least squares fit" between the longest sequence and the number of matched words;
2) a normalized "least squares fit" between the sizes, in words, of the thematic pattern and hom sequences;
3) a normalized "least squares fit" between the number of words matched and the number of matches that were in the correct order (as specified by the thematic pattern). If there were no matches between the two sequences, this item is set to 1; and
4) a normalized "least squares fit" between the size of the longest sequence and the number of matches that were in the correct position (as specified by the thematic pattern).

An example will amplify on factors 3) and 4). Assume i) the thematic pattern is "find the row with label t_row t_dot", ii) the "noisy" input sequence is "find labeled row jane.", and iii) the VP hom generated by substituting "label" for "labeled" is "find label row jane.".

Then there are 5 words in the VP of the thematic pattern (find, the, row, with, label), and three 3 words in the VP portion of the VP hom (find, label, row). Thus the largest sequence is 5. Since there are 3 words in common (matched) in the VPs (find, label, row), but only two in the correct order (find . . . row), the value of item 3) would be |3−2|/5=0.2. The value of item 4) is |5−1|/=0.8 because only one of the words in the VP hom (find) is in the proper position ($1^{st}$) as indicated by the thematic pattern. The total value for the advanced VP score is |5−3|/5+|5−3|/5+|3−2|/5+|5−1|/5=1.8. The advanced VP score is a sum of the "least squares fits" so lower is better and 0 is an exact match.

The basic VP score and the advanced VP score for t_lop VPs are obtained from the TRCC processing routines. The basic TRCC score is used as the basic VP score and the advanced TRCC score is used as the advanced VP score. TRCC scoring is described next.

The TRCC Scoring Parameters

Each sequence of words from the VP hom that corresponds to a TRCC in the thematic pattern is compared against all of the lexicons looking for the best match. However, just as the original input is homonynized with VP substitutions, the VP hom's TRCC sequences are homonynized with common "mispronunciations," "misrecognitions" and true homonym substitutions for the table, row and column names 170. The result is a set of TRCC homs. The TRCC homs are matched 210 against the ACE table lexicons 190 which are generated 180 when the ACE tables are input. The matching process is again a multiple associative parallel n X m comparison operation (n TRCC homonym phrases X m lexicons) where every word of every TRCC homonym phrase is broadcast one at a time to all of the lexicons. (The determiners "the", and "of the" are skipped but "an" and "a" can not be skipped because they are primitive map coordinate column names used by some spreadsheets. All words are normalized (i.e. plural "s" and possessive "'s" are stripped) before they are matched. An "of" between a row and column name is also skipped, i.e. "number of cars" is simply "number cars.) Each lexicon entry keeps track of the advanced TRCC score. The advanced TRCC score is a detailed measure of the closeness of the match. It is composed of the following factors:
1) a normalized "least squares fit" between the largest sequence and the number of matches,
2) a "least square fit" between the sizes of the segments normalized by the square of the largest (longest) segment, and
3) a dontCareCost factor (explained below).

When the number of words matched is counted, precaution is made not to count duplicate matches. That is, a match of a word in the lexicon entry is recorded only once per TRCC segment. Some of the lexicons have regular expressions in them such as "%" to allow numbers to be matched and "?", "*" and "$" to allow a single word or strings of words to be matched and saved (See FIG. 5). These matches are valued at less than a "pure" match. So that a "?" and "%" in the lexicon will match any word with a value of 0.9 per word. But "*" matches with a score of 1.0. Strings of "*" are terminated by a "!". When regular expressions are matched, the word(s) that was matched by the regular expression is retained for later use.

Occasionally, TRCCs will contain a VP keyword (for example, the second "add" and "to" in "add add in to to much."). While these may result in successful TRCC matches, they must be penalized in the overall frame scoring because they "consume" a VP. This penalty is recorded in the "dontCareCost" parameter.

The basic TRCC score is simply the number of words in the lexicon entry matched by the hom TRCC segment. Both TRCC scores are stored on a slot by slot basis and are the basis for evaluating the TRCC segments 220.

The Frame Scoring Formula

Frame evaluation to determine the best hom/thematic pattern/frame combination is based on three frame scores: basic, advanced and adjusted advanced 230.

The advanced frame score for a hom/thematic pattern/frame combination is determined first. It is obtained by summing the individual advanced VP and TRCC slot scores "normalized" by their sizes over all of the slots in the frame. The advanced frame score is penalized by the number of "not perfect" slot matches (i.e. those slot scores that are greater than zero) scaled by the square of the number of slots in the frame. In addition, it is assumed that the input command refers to the current active table (spreadsheet), thus if any slot references a table (sheet) that is not the active table (sheet), the advanced frame score is penalized by an amount that guarantees that the basic frame score must be used to select the winning combination.

The adjusted advanced frame score includes a factor for the number of homonym changes to the VP hom (HOMcount).

The basic frame score is the sum of the UNMATCHED words in the VPs and TRCCs plus the sum of the number of homonym changes in the VPs and TRCCs divided by the total number of words in the VP hom. The number of unmatched words and the total number of words is adjusted for any determiners that may have been skipped when processing the VP hom so that comparisons between different frame parsings is consistent.

Hom/Thematic Pattern/Frame Selection 240

When time is critical and parallelism is limited, the VP hom/thematic pattern/frame combinations are processed in the "best first" order as determined by the combination score formula. One condition for stopping the sequential loop is that the best adjusted advanced frame score is better (less) than a parameterized acceptable value and the next combination score is worse (bigger) than the last combination score. This condition assures that all the VP hom/thematic pattern/frame combinations with the same combination score are tested and that the best VP hom/thematic pattern/frame combination as measured by the adjusted advanced frame score is selected. That is to say, all hom/thematic pattern/frame combinations are scored until one is better than the threshold value and all hom/thematic pattern/frame combinations with the same combination score value have been also measured by the adjusted advanced frame score. This simplePE exit strategy is best used when the input is very reliable as for typed input or input from a file.

The simplePE strategy can be used when the input is known not to be noisy, but this patent is designed to handle noisy input, as when words are garbled or mistyped. That is, verbal commands like "Subtract age from john's size." may result in sequences like "Subtract age drum john's size." where "drum" represents a mistyped or misrecognized word. Since a VP is in error, the combination score may not accurately order the VPhoms. The verbal mode was designed for these cases. In the verbal mode, when a VPhom with an adjusted advanced frame score better than the threshold is detected, all of the VPhoms with the same and next best combination score values are considered and the VPhom/thematic pattern combination with the best adjusted advanced frame score from all considered is selected. Because considerably more combinations can be tried, this mode takes more time unless executed in parallel.

Since processing noisy input can be quite time consuming, especially if implemented on a sequential processor, a condition is provided to stop the process when a "perfect match" is found, even if the match contains homynizations. If the adjusted advanced frame score is below a threshold value and the basic frame score is zero (signaling a "perfect" match) a successful thematic pattern/frame match is declared and no more VPhoms are considered. The threshold value is initialized to 0.4 which is sufficient to allow a homonymized noisy input sequence to produce a perfect score. For example, the noisy sequence "add jane h. or size" requires the VP homonymization of "or" to "to" and the TRCC homonymization of "h." to "age". The resulting homonymization, "add jane age to size", results in a perfect thematic pattern/lexicon match. The 0.4 value allows the noisy inputs shown in FIG. 9 to be processed correctly and quickly. But it prevents the acceptance of the homonymization of "subtract age drum john size." to "subtract john size" which results in a perfect match but two words have to be modified (deleted in this case). The proper homonymization "subtract age from john size." (one word changed) is also a perfect match and meets the 0.4 threshold. The threshold value can be changed at run time.

If the short cut exit is not utilized, there are three levels of criteria for determining the best VP hom/thematic pattern/frame combination. First, if a frame's basic score is better than all other basic frame scores by 10%, it wins. Second, if a frames basic score is better than or equal to all other basic scores by 9% and its advanced score is better than all other advanced scores, it wins. Third, if a frames basic score is better than or equal to all other basic scores by 9% and its advanced score is better than or equal to all other advanced scores by 9% and the adjusted advanced score is better than all other adjusted advanced scores, it wins (Note, the 10% and 9% factors are system parameters and can be changed as needed). If there is no short cut exit and none of these three criteria are met, the frame with the best combination score is selected as the best VP hom/thematic pattern/frame combination.

The last step is to take the action appropriate for the selected best frame combination. The best frame is translated into a verbal or textual (or both) form and echoed back to the input device or user to verify that the input was understood correctly 250. Upon verification, a learning step may be taken to update the weights used to generate the scores. Further action is a function of the matched thematic pattern in the VP hom/thematic pattern/frame combination. If it is an action thematic pattern, the appropriate action is taken 260. For example, if it is a search action, the world model is searched for the requested information. If it is a command action, the command for the appropriate output device is generated and output to the appropriate device.

The invention claimed is:

1. A system that receives a noisy input sequence, and converts that noisy input sequence into one or more actions for a computing device, comprising:
  an input/output device; and
  a processor adapted to:
    receive the noisy input sequence from the input/output device,
    generate possible combinations of alternative input sequences through homonymization of verbs and preposition (VP) homonyms which are stored in a memory,
    pair the alternative input sequences with all matching thematic patterns,
    score the VP homonym and thematic pattern combinations for the noisy input sequence by counting a number of keywords in common with each VP homonym and thematic pattern based on a stored table having stored therein thematic relation patterns for an environmental model,
    generate a frame score for all VP homonym, thematic pattern and alternative frame parsing combinations which will be used for selecting a best match combination,
    select a best frame based on the frame score, and
    interpret and initiate at least one of the one or more actions associated with the thematic pattern of the selected best frame on the computing device.

2. The system of claim 1, wherein the processor further is adapted to:
  generate, for each VP homonym and thematic pattern combination, a vector of frames of the possible VP homonym parsings based on the thematic pattern.

3. The system of claim 2, wherein a best match between pattern segments and input segments is evaluated and verified.

4. The system of claim 2, wherein the frames are used to parse the VP homonyms into VP and TRCC (Table, Row, Column, and Cell) segments, wherein the verb, prepositions and TRCC segments are processed producing a frame score that measures a fit of the frame's VP homonym to the frame's associated thematic patterns.

5. The system of claim 2, wherein the processor is further adapted to determine a quality of a match between non-terminals and noun phrase segments.

6. The system of claim 4, wherein the VP homonym's TRCC sequences are normalized and then homonynized with user specified character data, common mispronunciations, misrecognitions, true homonym substitutions for the table, row and column names and true homonym substitutions for constants.

7. The system of claim 4, wherein an adjusted advanced frame score includes a factor for a number of homonym changes to the VP homonyms.

8. The system of claim 1, wherein stored lexicons represent semantic content of environment data files and further include lexicon entries comprising one or more of a constant, string, word sequence, regular expression, image, sensor input, computer input or an environment wide table, row and column identification and an associated combination of table, row and column names, and wherein the associated combination of table, row and column names includes one or more of: Table names, Row names, Column names, Row/Column names, Column/Row names, Table/row names, Table/column names, Table/row/column names, and Table/column/row names.

9. The system of claim 1, wherein the computing device is associated with one or more of a computer, an embedded computer, a personal computer, a laptop, a personal digital assistant, a cell phone, a remote control, an inventory control device, a home appliance, an automobile, a robot, a factory machine, a construction machine, a farming machine, an airplane, a sensor, and a remotely piloted aircraft.

10. A non-transitory computer readable information storage medium, having stored thereon instructions, that when executed by the processor of claim 1, cause the steps therein to be performed.

11. A method to receive a noisy input sequence and convert that noisy input sequence into one or more actions for a computing device comprising:
receiving the noisy input sequence from an input-output device connected to the computing device,
generating, by at least one processor associated with the computing device, possible combinations of alternative input sequences through homonymization of verbs and preposition (VP) homonyms which are stored,
pairing the alternative input sequences with all matching thematic patterns,
scoring the VP homonym and thematic pattern combinations for the noisy input sequence by counting a number of keywords in common with each VP homonym and thematic pattern based on a stored table having stored therein thematic relation patterns for an environmental model,
generating a frame score for all VP homonym, thematic pattern and alternative frame parsing combinations which will be used for selecting a best match combination,
selecting a best frame based on the frame score, and
interpreting and initiating at least one of the one or more actions associated with the thematic pattern of the selected best frame on the computing device.

12. The method of claim 11, further comprising
generating, for each VP homonym and thematic pattern combination, a vector of frames of the possible VP homonym parsings based on the thematic pattern.

13. The method of claim 12, wherein a best match between pattern segments and input segments is evaluated and verified.

14. The method of claim 12, wherein the frames are used to parse the VP homonyms into VP and TRCC (Table, Row, Column, and Cell) segments, wherein the verb, prepositions and TRCC segments are processed producing a frame score that measures a fit of the frame's VP homonym to the frame's associated thematic patterns.

15. The method of claim 12, further comprising determining a quality of a match between non-terminals and noun phrase segments.

16. The method of claim 14, wherein the VP homonym's TRCC sequences are normalized and then homonynized with user specified character data, common mispronunciations, misrecognitions, true homonym substitutions for the table, row and column names and true homonym substitutions for constants.

17. The method of claim 14, wherein an adjusted advanced frame score includes a factor for a number of homonym changes to the VP homonyms.

18. The method of claim 11, wherein stored lexicons represent semantic content of environment data files and further include lexicon entries comprising one or more of a constant, string, word sequence, regular expression, image, sensor input, computer input or an environment wide table, row and column identification and an associated combination of table, row and column names, and wherein the associated combination of table, row and column names includes one or more of: Table names, Row names, Column names, Row/Column names, Column/Row names, Table/row names, Table/column names, Table/row/column names, and Table/column/row names.

19. The method of claim 11, wherein the computing device is associated with one or more of a computer, an embedded computer, a personal computer, a laptop, a personal digital assistant, a cell phone, a remote control, an inventory control device, a home appliance, an automobile, a robot, a factory machine, a construction machine, a farming machine, an airplane, a sensor, and a remotely piloted aircraft.

20. The method of claim 11, wherein thematic relation patterns can be modified by a user and a user can add new thematic relation patterns to the environment.

21. The method of claim 13, wherein the verification allows a user to override the best match.

* * * * *